United States Patent
Meckley

[15] 3,664,084
[45] May 23, 1972

[54] APPARATUS FOR HANDLING ARTICLES

[72] Inventor: George E. Meckley, Abbottstown, Pa.

[73] Assignee: Hanover Guest Quality Foods Corporation, Hanover, Pa.

[22] Filed: Nov. 13, 1970

[21] Appl. No.: 89,772

[52] U.S. Cl. ................................ 53/59 R, 53/59 W, 53/78, 53/244, 53/253, 198/31 R
[51] Int. Cl. ............................................................ B65b 57/20
[58] Field of Search .................. 53/59 R, 59 W, 78, 244, 253; 198/31 R, 31 AB

[56] References Cited

UNITED STATES PATENTS 1,907,587  5/1933  Rundell .............................. 198/31 R
3,487,421  12/1969  Ruppel et al. ........................... 53/59 R

*Primary Examiner*—Travis S. McGehee
*Attorney*—Mason, Fenwick & Lawrence

[57] ABSTRACT

An apparatus suitable for use in packaging articles such as pretzels and the like generally including an endless feed conveyor belt for conveying the articles along a predetermined line of travel, a first endless load conveyor belt for conveying articles received from the feed conveyor belt to a container positioned at a selected position, a second endless load conveyor belt for conveying articles received from the feed conveyor belt to a container positioned at the second location, means for operating each of the load conveyor belts at predetermined high and low speeds, means for guiding articles carried at random by the feed conveyor belt selectively onto the first and second load conveyor belts, and control means operative alternatively to operate one of the feed conveyor belts at the predetermined low speed while the guiding means operates to guide articles from the feed conveyor belt onto the one load conveyor belt and the other load conveyor belt operates at the predetermined high speed whereby the load conveyor belts operate alternatively at high speeds to load groups of the articles into a container positioned at the selected location.

35 Claims, 15 Drawing Figures

Patented May 23, 1972
3,664,084
8 Sheets-Sheet 1
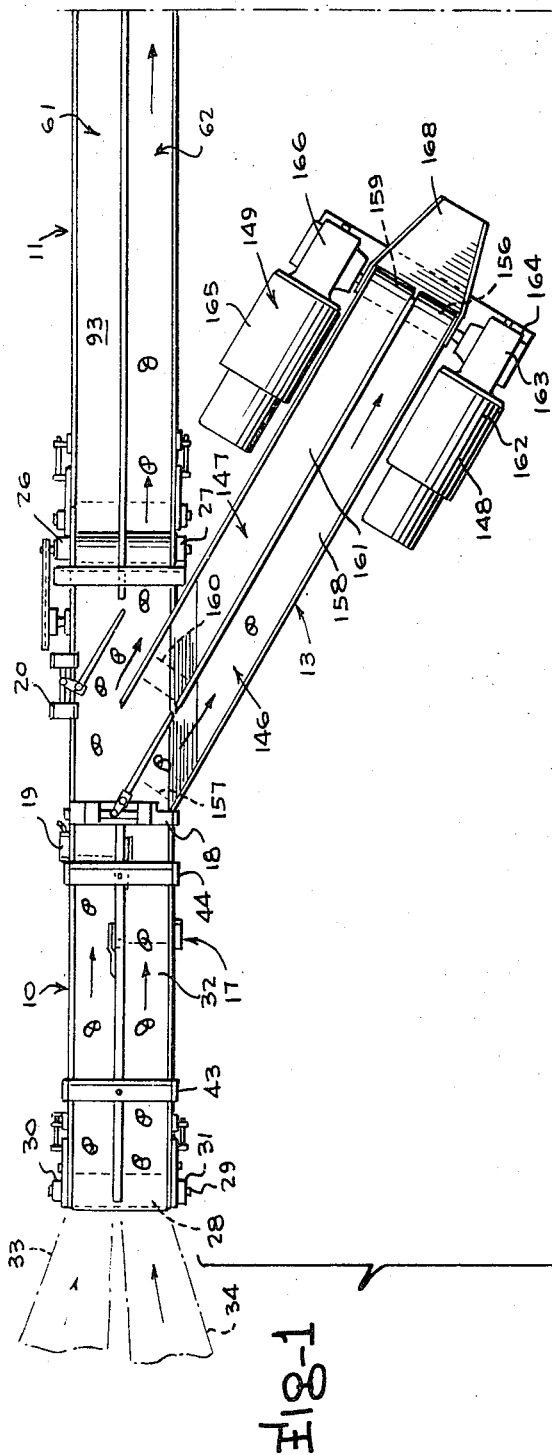
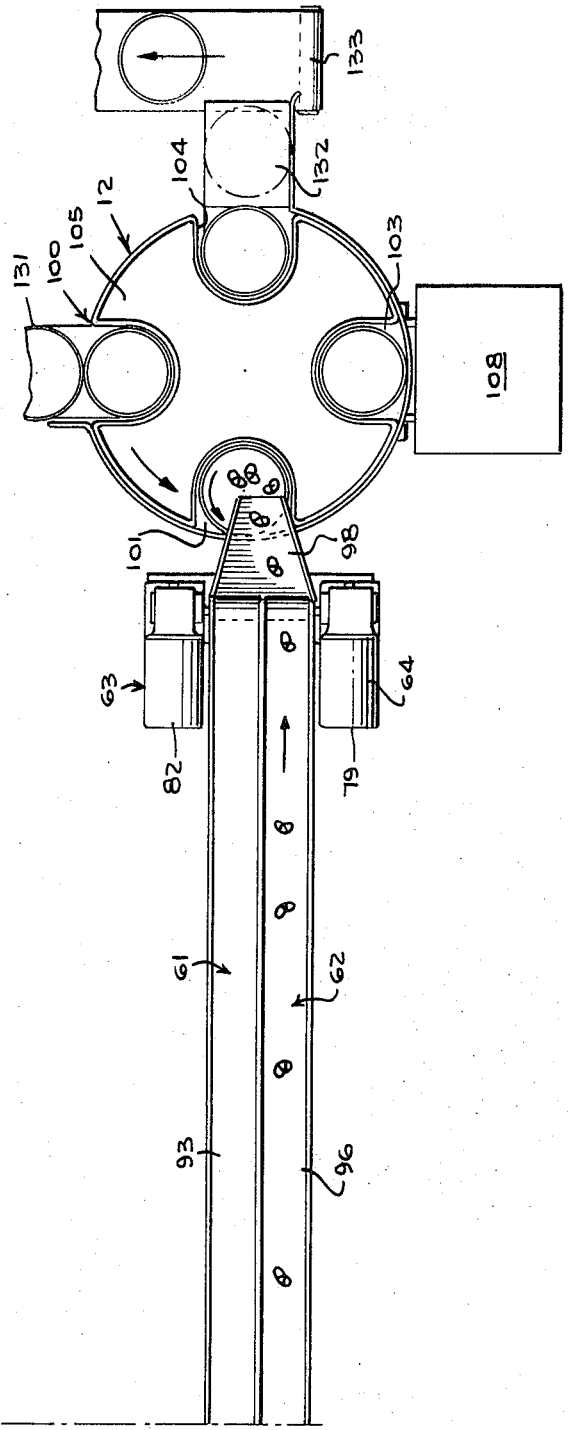
INVENTOR
GEORGE E. MECKLEY
BY Mason, Fenwick & Lawrence
ATTORNEYS

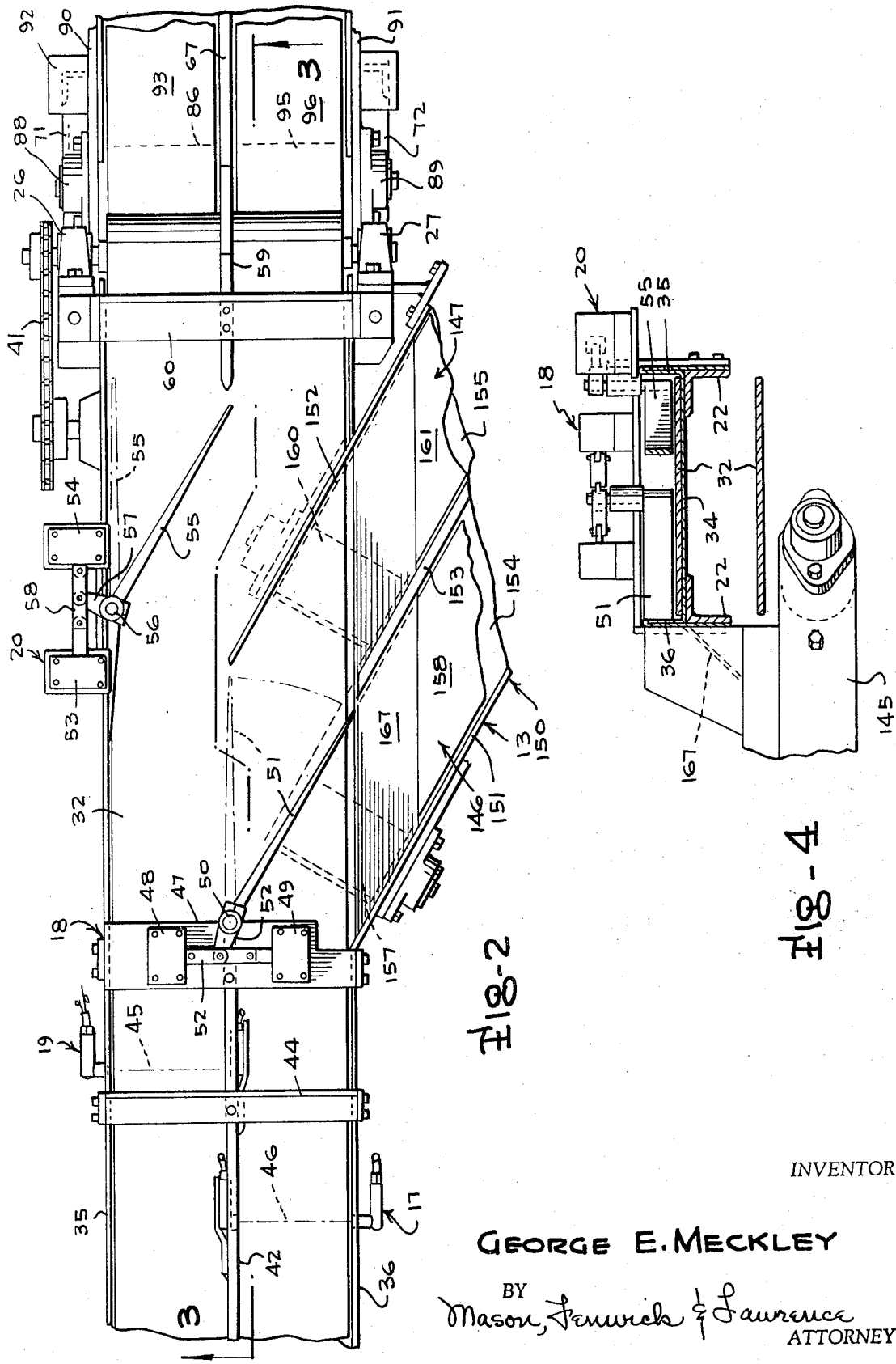

Patented May 23, 1972
3,664,084
8 Sheets-Sheet 3
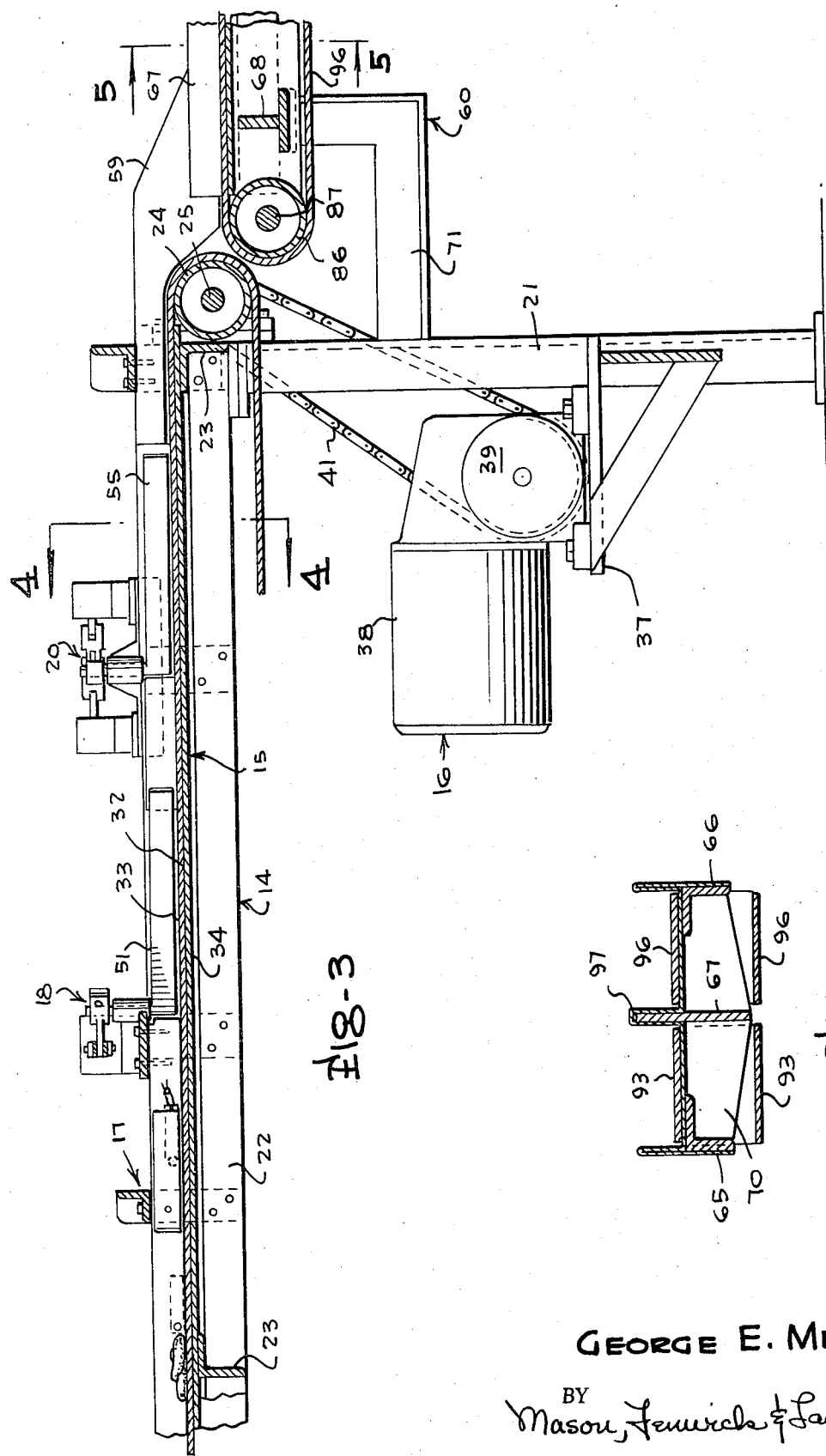
INVENTOR
GEORGE E. MECKLEY
BY Mason, Fenwick & Lawrence
ATTORNEYS

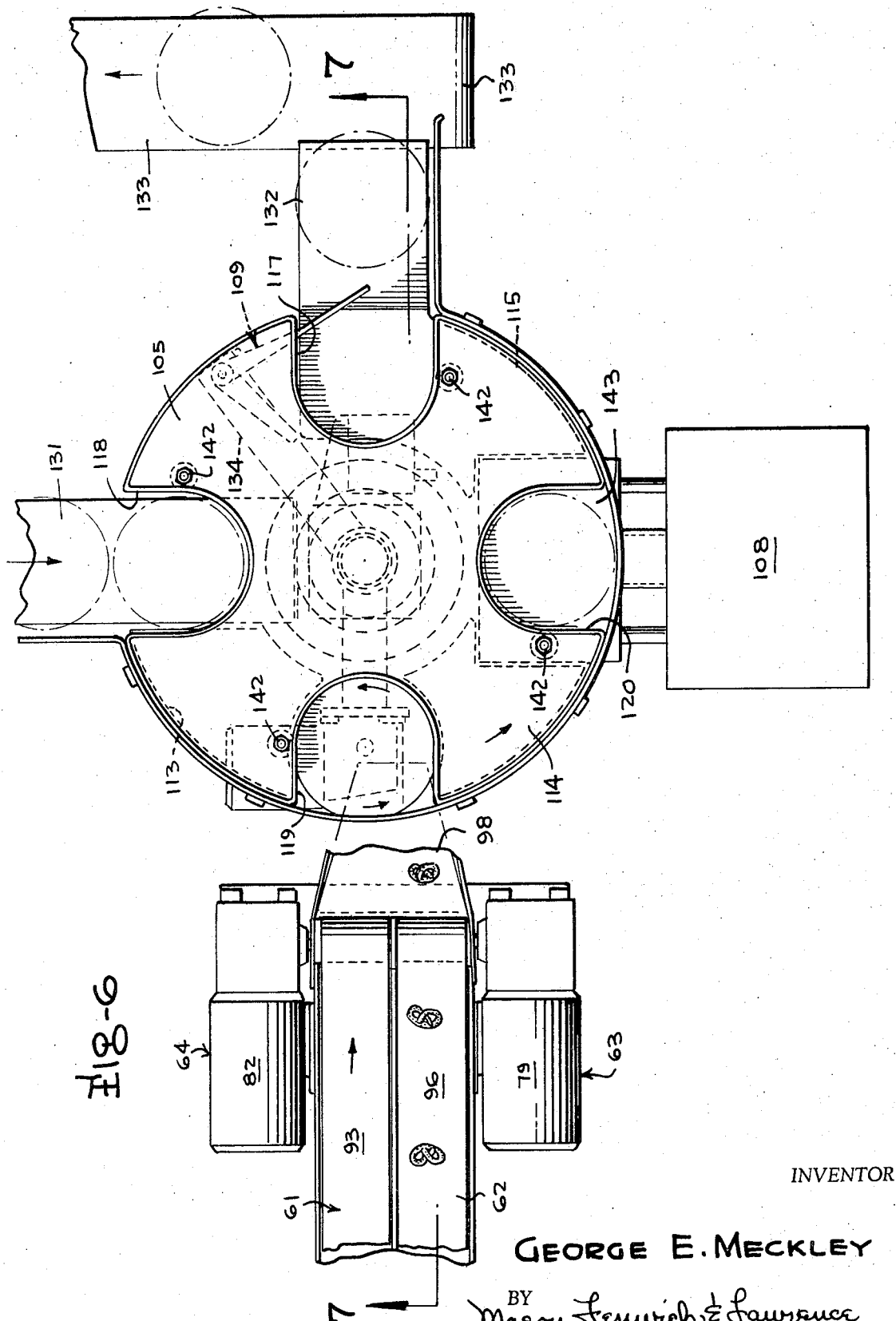

Patented May 23, 1972
3,664,084
8 Sheets-Sheet 5
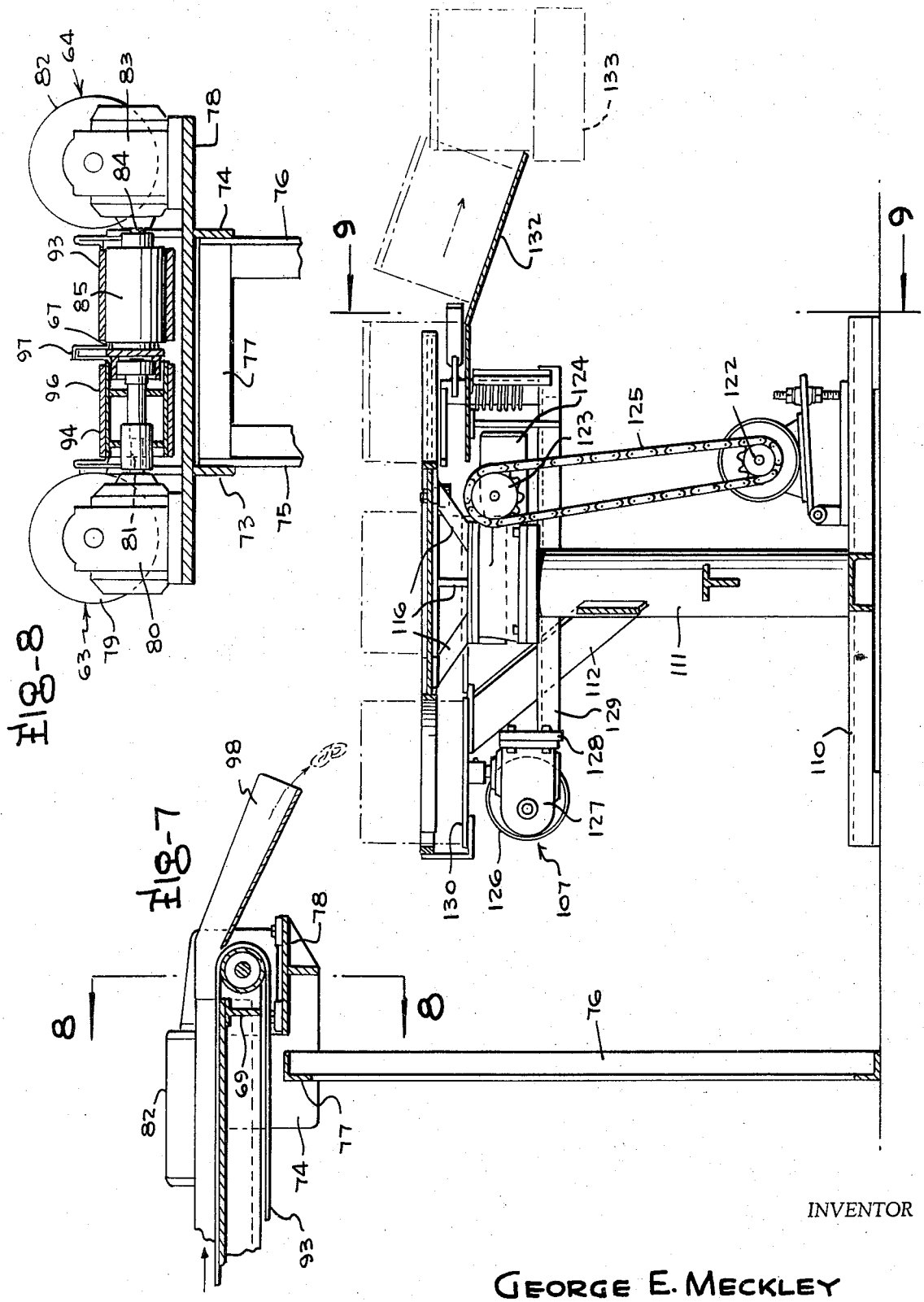
INVENTOR
GEORGE E. MECKLEY
BY Mason, Fenwick & Lawrence
ATTORNEYS Patented May 23, 1972
3,664,084
8 Sheets-Sheet 6
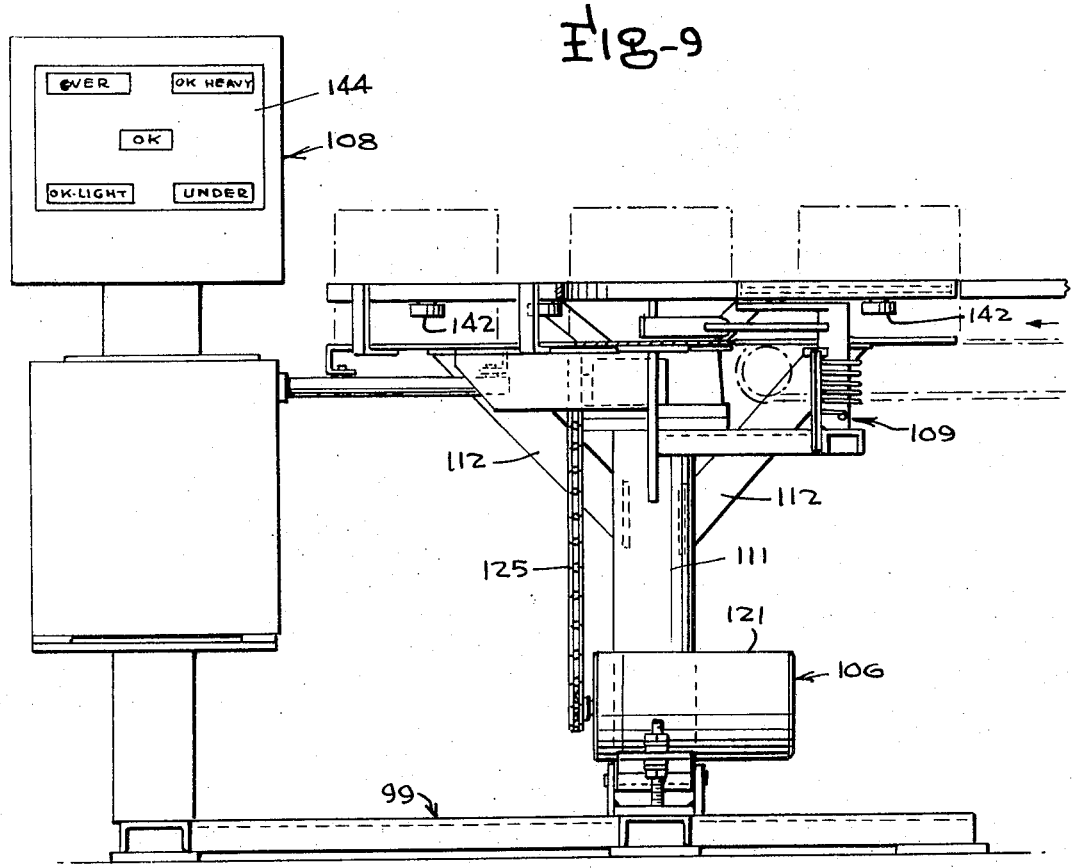
Fig-9
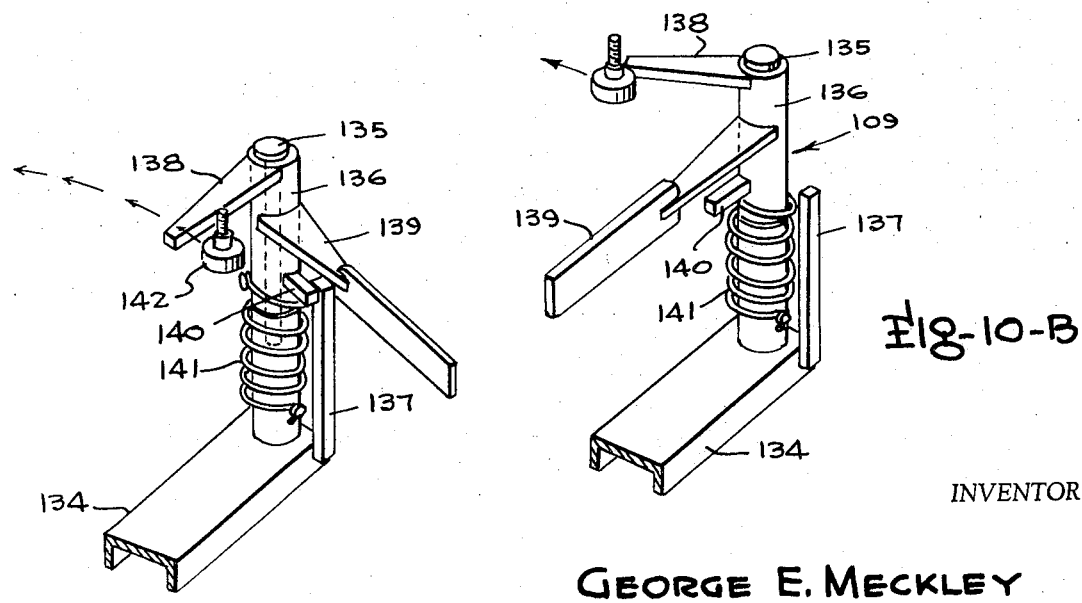
Fig-10-A
Fig-10-B
INVENTOR
GEORGE E. MECKLEY
BY Mason, Fenwick & Lawrence
ATTORNEYS

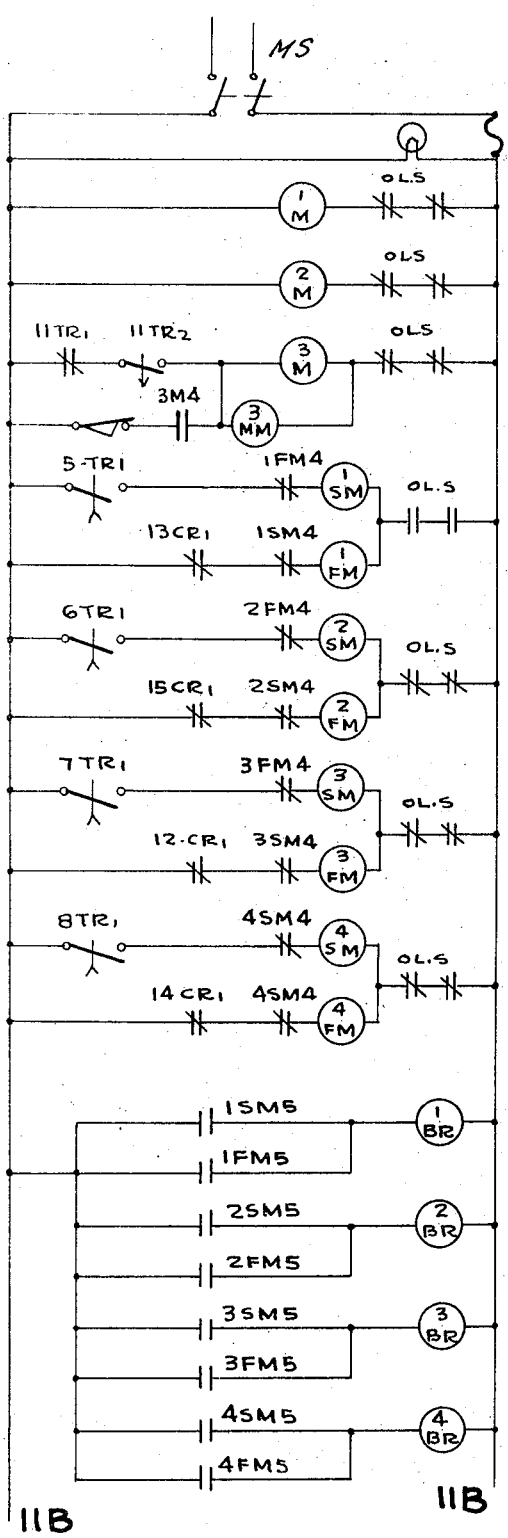
Fig-11-A
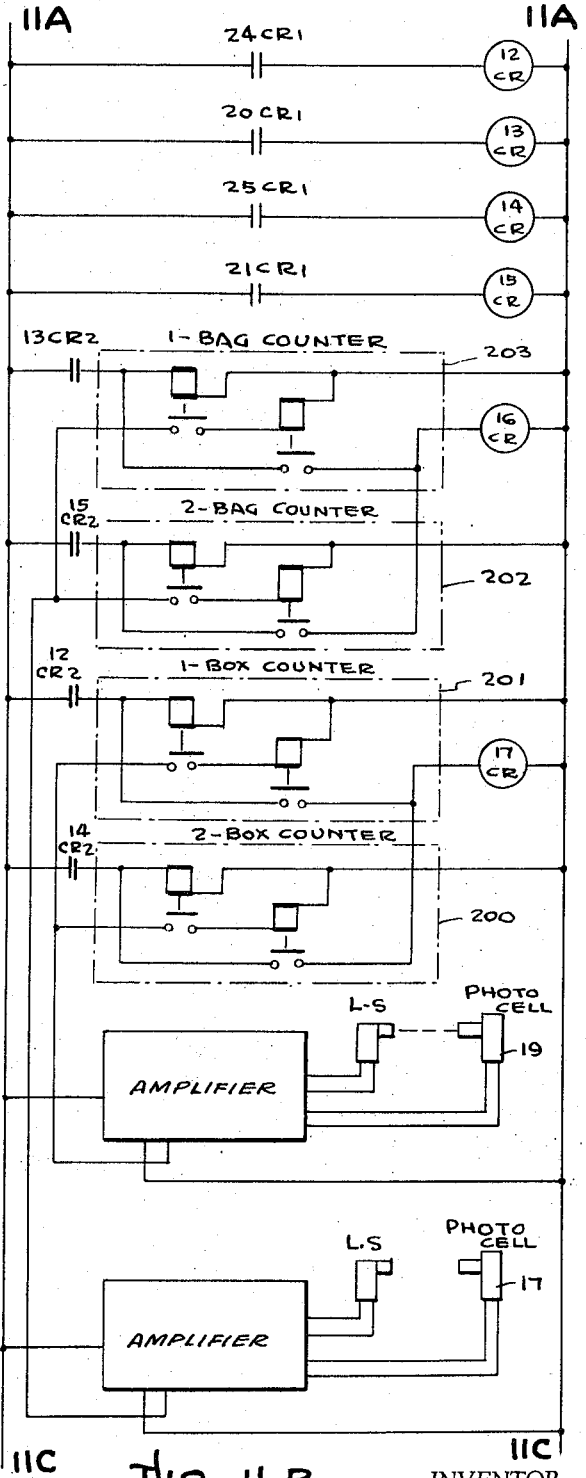
Fig-11-B
INVENTOR
GEORGE E. MECKLEY
BY Mason, Fenwick & Lawrence
ATTORNEYS

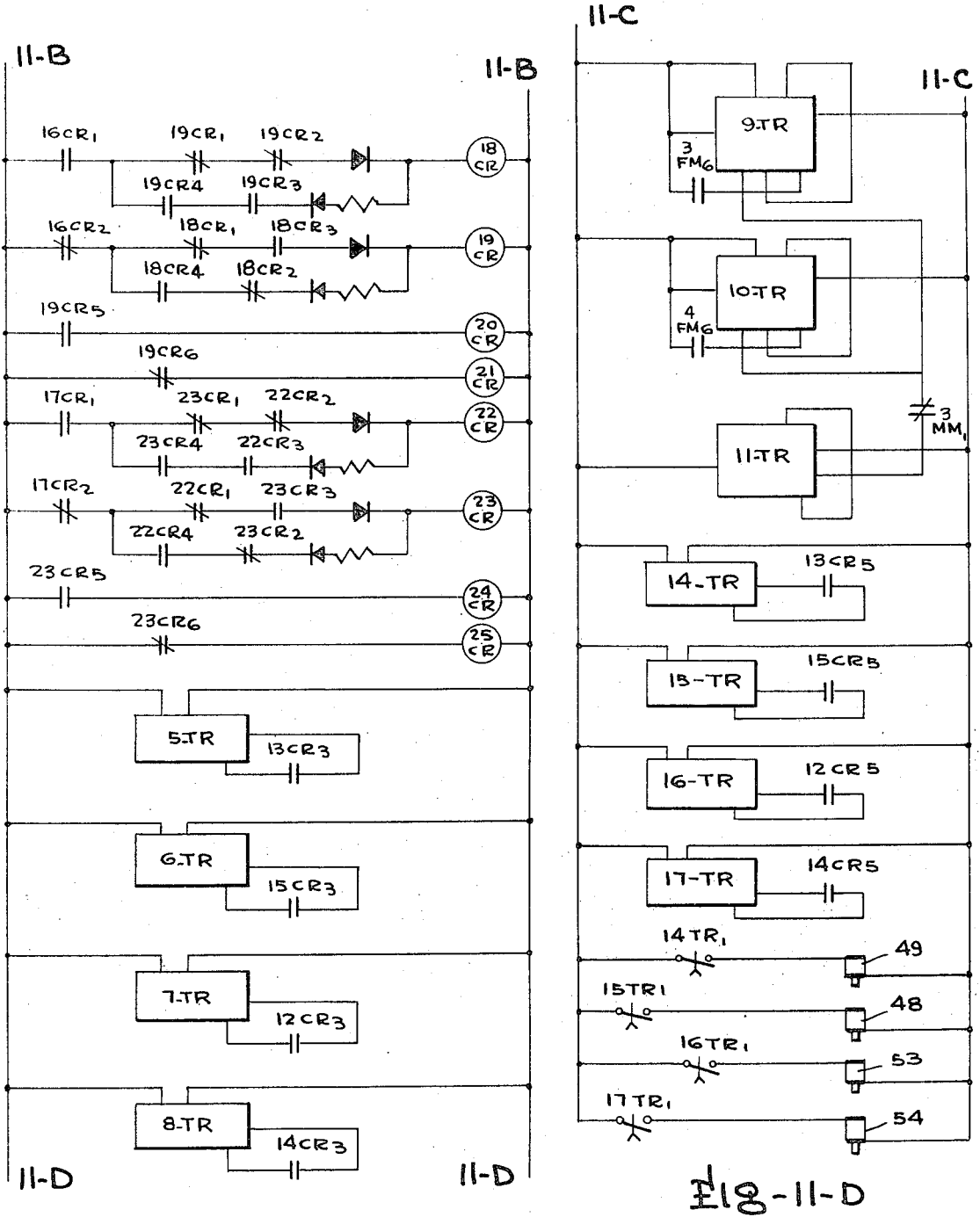

APPARATUS FOR HANDLING ARTICLES

This invention relates to an article handling apparatus and more particularly to an apparatus suitable for use in packaging articles such as pretzels and the like.

In the production of pretzels and particularly large size pretzels commonly referred to as beer pretzels, it has been the conventional practice in the pretzel baking industry to package such pretzels manually. Such practice has been found to be unsatisfactory due to the comparatively high cost of production and insufficient product quality. The high cost of production has resulted from the high cost of labor required to manually package the pretzels, inherent speed limitations in the manual packaging operation and ordinary loss of efficiency due to general human factors. Insufficient product quality has resulted from poorer sanitary conditions inherent in the manual handling of pretzels, and the breakage and removal of salt from the pretzels in manually handling the pretzels during the packaging operation. It thus has been found desirable to provide an apparatus suitable for use in packaging articles such as pretzels and the like which reduces the number of personnel required for the packaging operation and minimizes the physical contact of the personnel with the pretzels.

Accordingly, it is the principal object of the present invention to provide a novel article handling apparatus.

Another object of the present invention is to provide a novel article handling apparatus suitable for use in packaging operations.

A further object of the present invention is to provide a novel article handling apparatus suitable for use in a packaging operation which minimizes the amount of manual handling of the articles.

A still further object of the present invention is to provide a novel article handling apparatus suitable for use in a packaging operation which automatically counts and/or weighs the articles.

Another object of the present invention is to provide a novel article handling apparatus suitable for use in a packaging operation which is adapted to mechanically count certain articles and load them into containers.

A further object of the present invention is to provide a novel article handling apparatus suitable for use in a packaging operation which is comparatively simple in structure, efficient in operation, and relatively easy to maintain and service.

A still further object of the present invention is to provide a novel article handling apparatus suitable for use in packaging articles such as pretzels and the like.

Another object of the present invention is to provide a novel article handling apparatus suitable for counting and loading articles such as pretzels in the packaging of such articles.

A further object of the present invention is to provide a novel article handling apparatus suitable for use in mechanically counting and loading pretzels into containers, which is adapted to provide minimum manual contact with such pretzels thereby minimizing the breakage and removal of salt from said pretzels and improving the sanitary conditions under which such pretzels are packaged.

A still further object of the present invention is to provide a novel article handling apparatus adapted to count and load articles at different loading stations simultaneously.

Another object of the present invention is to provide a novel article handling apparatus suitable for use in a packaging operation for counting and loading pretzels into containers, which is comparatively simple in construction, efficient in operation, and readily adaptable for maintaining and servicing.

Other objects and advantages of the present invention will become more apparent to those persons having ordinary skill in the art to which the present invention relates, from the following description taken in conjunction with the accompanying drawings wherein:

FIG. 1 is a top plan view of an embodiment of the invention;

FIG. 2 is an enlarged top plan view of a portion of the embodiment illustrated in FIG. 1;

FIG. 3 is a cross-sectional view taken along line 3—3 in FIG. 2;

FIG. 4 is a cross-sectional view taken along line 4—4 in FIG. 3;

FIG. 5 is a cross-sectional view taken along line 5—5 in FIG. 3;

FIG. 6 is an enlarged top plan view of the embodiment shown in FIG. 1, illustrating in greater detail the container transfer unit thereof;

FIG. 7 is a cross-sectional view taken along line 7—7 in FIG. 6;

FIG. 8 is a cross-sectional view taken along line 8—8 in FIG. 7.

FIG. 9 is a cross-sectional view taken along line 9—9 in FIG. 7;

FIG. 10a is a perspective view of an ejector mechanism utilized in the aforementioned embodiment, illustrating the mechanism in the unloaded condition;

FIG. 10b is a perspective view of the mechanism shown in FIG. 10a, illustrating the mechanism in the loaded condition; and FIGS. 11a through 11d illustrate a control system for the embodiment illustrated in FIGS. 1 through 10.

Briefly described, the present invention relates to an apparatus for handling articles such as pretzels and the like generally including a first means for conveying the articles along a predetermined line of travel, a second means for conveying articles received from the first conveying means to a selected location, a third means for conveying articles received from the first conveying means to the selected location, means for operating the second conveying means selectively at predetermined high and low speeds, means for operating the third conveying means selectively at predetermined high and low speeds, means for guiding articles carried at random on the first conveying means selectively onto the second and third conveying means, and control means operative alternatively to operate one of the second and third conveying means at the predetermined slow speed while the guiding means operates to guide articles onto the one conveying means while the other of the second and third conveying means operates at the predetermined high speed whereby the second and third conveying means operate alternatively at high speeds to convey groups of the articles to the selected location.

Preferably, the apparatus includes means for transferring containers for receiving groups of the articles along a predetermined line of travel including a container loading station, an article loading station coinciding with the selected location and a container unloading station, and indexing means for advancing each of the containers from one of the stations to a successive one of the stations preceding the fast speed operation of each of the second and third conveying means. In addition, there may be provided a fourth means for conveying articles received from the first conveying means to a second selected location, a fifth means for conveying articles received from the first conveying means to the second selected location, means for operating the fourth conveying means selectively at predetermined high and low speeds, means for operating the fifth conveying means selectively at predetermined high and low speeds, and means for guiding articles carried by the first conveying means selectively onto the fourth and fifth conveying means, and the control means includes means operative alternatively to operate one of the fourth and fifth conveying means at the predetermined slow speed while the guiding means operates to guide articles onto the the conveying means while the other of the fourth and fifth conveying means operates at the high speed whereby the fourth and fifth conveying means operate alternatively at high speed to convey groups of articles alternatively to the second selected location.

Referring to the drawings, there is illustrated an embodiment of the invention adapted simultaneously to load pretzels into box and bag containers, which generally includes a feeding unit 10, a box container loading unit 11, a box container transfer unit 13 and a bag container loading unit 13. As best illustrated in FIGS. 1, 2 and 3, the feeding unit 10 includes a frame assembly 14, a conveyor assembly 15 mounted on the frame and a drive assembly 16 mounted on the frame assembly 14 and operatively connected on the conveyor assembly. The unit 10 further is provided with a photoelectric sensing unit 17 and a diverter mechanism 18, mounted on the frame assembly 14 which cooperate with the bag container loading unit 13, and a photoelectric sensing unit 19 and a diverter mechanism 20 which cooperate with the box container loading unit 11.

The frame assembly 14 consists of a plurality of leg members 21 which support at their upper ends a pair of spaced, longitudinally disposed frame members 22 interconnected by a plurality of transversely disposed frame members 23. Preferably, the frame is of a welded steel construction having a sufficient strength and rigidity to readily support the operating components of the feeding unit.

The conveyor assembly 15 is provided with a drive roller 24 having shaft 25 with the ends thereof journalled in bearings 26 and 27 mounted on the upper ends of the front legs 21 of the frame assembly, and an idler roller 28 having a shaft 29 with the ends thereof journalled in bearings 30 and 31 which are mounted on the upper ends of the rear legs 21 of the frame assembly, and an endless conveyor belt 32 mounted on the drive roller 24 and the idler roller 28, for conveying pretzels fed on the rear end thereof by a pair of chutes 33 and 34 to the loading units 11 and 13. As best illustrated in FIGS. 1 and 2, the upper flight of the conveyor belt is guided along the upper end of the frame assembly between the rollers 28 and 24 by a member 33 having an elongated horizontal wall spanning and secured to the upper ends of the frame members 22 which supports the upper flight of the conveyor belt 32, and a pair of side walls 35 and 36 guiding the side edges of the upper flight of the belt 32 and having the lower portions thereof secured to the outer sides of the frame members 22.

Rigidly secured to the front legs 21 of the frame assembly is a support platform 37 on which the drive assembly 16 is mounted. The assembly consists of an electric motor 38 provided with a gear reduction unit 39. Drive is transmitted from the output shaft of the reducer through a drive sprocket mounted on the output shaft, a chain belt 40 and a sprocket mounted on shaft 25, to drive the roller 24. The motor 38 is operated continuously during the operation of the apparatus to continuously drive the feed conveyor belt 32.

Disposed rearwardly of the diverter unit 18 is an elongated divider wall 42. The divider wall is secured to the undersides of a pair of overhead brackets 43 and 44, and is spaced parallel to the side walls 35 and 36 of the belt guide member. The divider wall 43 functions to guide pretzels deposited on the conveyor belt 32 along parallel lines of travel. Pretzels carried by the conveyor belt 32 between the side wall 35 and the divider wall 42 will interrupt a light beam 45 projected across the line of travel of the pretzels by the photoelectric sensing unit 19. Similarly, pretzels carried by the conveyor belt 32 between the side wall 36 and the divider wall 42 will interrupt a light beam 46 projecting across the line of travel of the pretzels. As the light beams 45 and 46 of the photoelectric sensing units are interrupted, electrical signals will be transmitted to counters, as will later be described.

Bridging the side walls 35 and 36 of the guide member forwardly of the bracket 44, and secured to the frame assembly 14, is a support bracket 47 on which there is mounted the diverter unit 18 which includes a pair of transversely spaced actuating solenoids 48 and 49 and an intermediately disposed vertical pivot post 50. A diverter gate 51 is pivotally mounted on the post 50, which is provided with a rearwardly projecting arm 52 pivotally connected to a linking member 52. The ends of the linking member 52 are connected to the movable plungers of the solenoids 48 and 49 so that when such solenoids are energized alternately, the diverter gate 51 will be moved between the position as illustrated in solid lines and the position illustrated in phantom lines in FIG. 2, to alternately divert pretzels carried on the conveyor belt 32 between the side wall portion 36 and the divider wall 42, to one of two parallel conveyor belts of the bag container loading unit 13, as subsequently will be described.

The second diverter unit 20 consists of a pair of longitudinally spaced solenoid actuators 53 and 54 mounted on a bracket 55 secured to the frame assembly and a divider gate 55 which is pivotally mounted on a post member 56 of a bracket 55. The diverter gate 55 further is provided with a laterally projecting arm 57 which is pivotally connected to a linking member 58 interconnecting the plungers of the solenoids 53 and 54. The diverter gate 55 is moved between the position shown in solid lines to the position shown in phantom lines in FIG. 2 when the solenoids 53 and 54 are energized alternatively, to divert pretzels carried on the conveyor belt 32 between the side wall portion 35 and the divider wall 42 onto a pair of parallel conveyor belts of the box container loading unit, as will later be described. As best illustrated in FIG. 2, a divider wall 59 disposed in alignment with divider wall 42, is provided forwardly of the diverter gate 55, which is supported from an overhead bracket 60 which bridges the side walls 35 and 36 and is secured to the upper ends of the front legs 21 of the frame assembly.

The box container loading unit 11 consists of a frame assembly 60, a pair of independently operable conveyor assemblies 61 and 62 mounted on the frame assembly 60, and a pair of drive assemblies 63 and 64 mounted on the frame 60 and operatively connected to the conveyor assemblies 61 and 62, respectively. The frame assembly 60 includes a pair of spaced, longitudinally disposed side frame members 65 and 66, a longitudinally disposed divider wall member 67 spaced intermediate the side frame members 65 and 66, a pair of transversely disposed frame members 68 and 69 interconnecting the front and rear ends of the longitudinally disposed frame members 65 and 66, and a plurality of transversely disposed frame members 70 longitudinally spaced between the frame members 68 and 69 and interconnecting the side frame members 65 and 66. The frame assembly further includes a pair of brackets 71 and 72 which are mounted on the front frame legs 21 of the frame assembly 14 and support the outer ends of the frame member 68 on upwardly projecting portions thereof. In addition, the front end of the frame assembly is provided with a pair of depending and forwardly projecting brackets 73 and 74 which are secured to the sides of the front ends of the side frame members 65 and 66. The brackets 73 and 74 are secured to a pair of front support leg members 75 and 76 which are provided with a transversely disposed frame member 77 interconnecting the upper ends thereof. A mounting platform 78 is supported on the brackets 73 and 74, for mounting the drive assemblies 63 and 64.

The drive assembly 63 consists of a motor unit 79 and a gear reduction unit 80 mounted on the support platform 78, having an output shaft 81. Similarly, the drive assembly 64 consists of a motor unit 82 provided with a gear reduction unit 83 mounted on the support platform 78, having an output shaft 84 disposed coaxially with the shaft 81. The motor units 79 and 82 are 220 volt, three-phase motors, each of which are selectively operable at predetermined high and low speeds. Each of the motor units 79 and 82 also are provided with mechanical brakes, which function to brake the motors when the motors are de-energized, between high and low speed operations.

The conveyor assembly 61 is provided with a drive roller 85 mounted at one end thereof on the shaft 84 and supported on the opposite end thereof on a bearing secured to the divider wall 67, an idler roller 86 having a shaft journalled in a bearing 88 mounted on a bracket 90 and a bearing mounted on divider wall 67, and a conveyor belt 93 supported on the drive roller 85 and the idler roller 86. Similarly, the conveyor assembly 62 consists of a drive roller 94 mounted at one end thereof on shaft 81 and supported on the other end thereof on a bearing mounted on the divider wall 67, an idler roller 95 mounted on a shaft journalled in a bearing mounted on a bracket 91 and a bearing mounted on the divider wall 67, and an endless conveyor belt 96 mounted on the drive roller 94 and the idler roller 95. The brackets 90 and 91, and the frame member 68 are supported on a transversely disposed member 92 seated on the upwardly projecting portions of brackets 71 and 72.

Mounted on the frame assembly and secured to the side frame members 65 and 66 and the divider wall 67, is a guide member 97 providing a pair of upwardly opening, channel shaped portions for supporting and guiding the upper flights of the conveyor belts 93 and 96. It will be seen that upon operation of the drive assemblies 63 and 64, the conveyor belts 93 and 96 will be driven to convey pretzels deposited on the rear ends thereof, to a chute 98 which functions to guide pretzels from either of the conveyor belts 93 and 96 into a box container positioned at the loading station of the box container transfer unit 12.

Referring to FIGS. 6 through 10, the box container transfer unit 12 includes a frame assembly 99 which provides a box container loading station 100, a pretzel loading station 101, a weighing station 103, and a box container unloading station 104. The unit 12 further consists of an indexing plate 105 rotatably mounted on a frame assembly 99, a drive assembly 106 mounted on the frame assembly for rotatably advancing the indexing plate 105, a drive assembly 107 mounted on the frame assembly for supporting and rotating a container positioned at the pretzel loading station, a weighing unit 108 for weighing pretzel filled containers positioned at the weighing station 103, and an mechanism 109 mounted on the frame assembly for ejecting pretzel filled containers at the unloading station 104.

The frame assembly 99 includes a base section 110 which supports a post member 111. The post member 111 is provided with a plurality of upwardly and outwardly projecting arm members 112 which support a container support section 113 disposed between the container loading station 100 and the pretzel loading station 101, a container support section 114 disposed between the pretzel loading station 101 and the container weighing station 103, and a container support section 115 disposed between the container weighing section 103 and the container loading section 100. The support sections 113, 114 and 115 lie in a horizontal plane disposed below the lower end of the loading chute 98, as best illustrated in FIG. 7.

The indexing plate 105 is spaced vertically from the sections 113, 114 and 115, and is supported by a plurality of upwardly and outwardly extending arms 116 which are mounted at their lower ends on a vertical shaft journalled in the upper end of the post member 111. The index plate 105 further is provided with circumferentially spaced recesses 117 through 120 which are adapted to receive box containers and transfer such containers from one station to a succeeding station when the plate 105 is indexed by the drive assembly 106. The circumferential spacing of the recesses 117 through 120 corresponds to the circumferential spacing of the stations 100 through 104 so that each time the plate 105 is indexed by the drive assembly 106, a container will be positioned at one of the stations 100 through 104.

Referring to FIGS. 8 and 9, the drive assembly 106 includes a 220 volt, three-phase motor 121 mounted on the base section 110 of the frame assembly, which is provided with a drive sprocket 122 on the output shaft thereof. Drive is transmitted from the sprocket 122 to a sprocket 123 mounted on an input shaft of a gear box 124, by means of a drive chain 125. The gear box 124 is mounted on the upper end of the post member 111 and is operatively connected to the shaft of the indexing plate 125 so that when the motor 121 is operated, drive will be transmitted to the vertical support shaft of the indexing plate to rotate the indexing plate about a vertical axis.

The rotating assembly 107 consists of a 220 volt, three-phase motor 126 having a speed reducer 127 mounted on a bracket 128. The bracket 128 is supported on the free end of an arm 129 projecting outwardly from the upper end of the post member 111. The speed reducer 127 is provided with an upwardly projecting drive shaft on which there is mounted a container support platform 130. The platform 130 lies between and in the same plane as the stationary support sections 113 and 114 so that containers advanced by the indexing plate 105 will be moved onto the platform 130 from the support section 113 and off of the platform 130 onto the support section 114 without obstruction to the travel of the container. The rotatable platform 130 also is positioned at the pretzel loading station. As best illustrated in FIG. 6, the discharge end of the feed chute 98 is positioned off center relative to the axis of rotation of the rotatable platform 130.

Containers are fed onto the transfer unit by means of chute 131, and are ejected from the unit onto a chute 132 which guides the containers onto a conveyor 133. The loading chute 131 is disposed substantially radially relative to the vertical axis of the post member 111 and extends between the platform sections 113 and 115 so that when a recess 117, 118, 119 or 120 is aligned with the loading chute 131, a container will be gravity fed into the recess to be advanced along a circular path to successive stations of the unit. As each container becomes positioned at the unloading station 104, it is ejected onto the unloading chute 132 by the ejector mechanism 109.

The ejector mechanism 109, is mounted on a radially disposed arm member 134, and is positioned between the container unloading station 104 and the container loading station 100. It includes a vertical pivot post 135 disposed at the free end of the support arm 134, a mounting sleeve 136 pivotally mounted on the post 135 and a limit post 137 disposed adjacent to and parallel to the pivot post 135. The mounting sleeve 136 is provided with a radially disposed trip arm 138, a radially disposed pusher arm 139 angularly displaced relative to the trip arm 138 and a radially disposed abutment 140 angularly displaced from the pusher arm 139 in the direction of the trip arm 138. The mechanism is provided with a coil spring 141 which biases the mounting sleeve in a counterclockwise direction relative to FIGS. 10 and 10b to urge the abutment 140 into engagement with the limit post 137 as illustrated in FIG. 10a.

In the operation of the ejector mechanism, when the mechanism is in the condition as illustrated in FIG. 10a and the index plate is rotated by the drive assembly 106 to advance each of the containers to a succeeding station, a depending roller 142 one of which is provided on the trailing side of each of the recesses 117 through 120, engages the trip arm 138 to rotate the mounting sleeve 136. As the sleeve rotates in a clockwise direction, the pusher arm 139 is pivoted in a clockwise direction to clear the unloading station 104, and the coil spring 141 is loaded. When a container carried in one of the recesses 117 through 120 is positioned at the unloading station 104, the roller 142 will clear and thus release the trip arm 138. When this occurs, the action of the loading spring 141 will cause the mounting sleeve 136 to rotate in a counterclockwise direction and the pusher arm 139 to engage the container positioned at the unloading station 104 to eject the container onto the discharge chute 127. The trip arm 138 subsequently will be engaged by the next roller 142 to again load the mechanism for ejecting the next container positioned at the unloading station.

The weighing station 108 functions to insure the proper weight of each loaded container. It includes a weighing platform 143 disposed between and in the same plane as the platform sections 114 and 115 so that containers filled at the pretzel loading station 101 will be advanced onto the weighing platform 143 and then advanced to the unloading station 104 without any obstruction.

As best illustrated in FIG. 9, the weighing assembly is provided with a display panel 144 which indicates whether the weight of a loaded container positioned on the platform 143, is over, under or proper. By reading the display panel, an operator can make adjustments to the weight of the loaded container by manually adding or removing pretzels from the container.

The bag container loading unit 13 is similar in construction and operation to the box container loading unit 11, and consists of a frame assembly 145, a pair of independently operable conveyor assemblies 146 and 147 mounted on the frame assembly 145, and a pair of drive assemblies 148 and 149 mounted on the frame assembly 145 and operatively connected to the conveyor assemblies 146 and 147, respectively. As best illustrated in FIGS. 1, 2 and 4, the conveyor assemblies 146 and 147 are disposed below the level of and at an angle to the feed conveyor belt 32 so that pretzels carried by the feed conveyor belt 32 between the side wall 36 and the divider wall 42 will be diverted by the diverter gate 51 from the belt 32 alternatively onto the conveyor assemblies 146 and 147.

The frame assembly 145 is similar in construction to the frame assembly 60 of the box container loading unit 11 and includes a pair of elongated side frame members interconnected along their lengths by a plurality of spaced, cross frame members, which are secured at their rearward ends to the frame assembly 14 of the feeding unit 10 and supported at their free ends on a pair of support legs similar to the support legs 75 and 76 of the box container loading unit 11. Mounted on the frame assembly 145 is a conveyor belt guide unit 150 having a pair of spaced, side walls 151 and 152, a divider wall 153 spaced between the side walls 151 and 152, and a pair of bottom walls 154 and 155 defining a pair of parallel, upwardly opening channels for guiding the upper flights of the conveyor belts of assemblies 146 and 147. As best illustrated in FIG. 2, the side wall 150 extends to the front end of the side wall 36, the side wall 152 extends above the feed belt 32 to a point in alignment with the divider wall 42, and the divider wall 153 extends to the edge of the feed belt 32, in alignment with the diverter gate 51, as shown.

The conveyor assemblies 146 and 147 are substantially similar to the conveyor assemblies 61 and 62. The conveyor assembly 146 includes a drive roller 156 disposed at the front end of the unit, an idler roller 157 mounted at the rearward end of the unit and an endless conveyor belt 158 trained around the rollers 156 and 157 and having the upper flight thereof guided in the channel of guide unit 150 defined by the side wall 151, divider wall 153, and bottom wall 154. The conveyor assembly 147 similarly includes a drive roller 159 disposed coaxially with the drive roller 156, and idler roller 160 mounted at the rear end of the unit and forwardly of the idler roller 157, and an endless conveyor belt 161 trained around the rollers 159 and 160 and having its upper flight guided along the channel of guide unit 150 defined by the side wall 152, divider wall 153 and bottom wall 155.

The drive assemblies 148 and 149 also are similar to the drive assemblies 63 and 64 described in connection with the box container loading unit 11. The drive assembly 148 consists of a motor unit 162 and a gear reduction unit 163 mounted on a support platform 164 disposed on the frame assembly, having an output shaft operatively connected to the drive roller 156. Similarly, the drive assembly 149 consists of a motor unit 165 provided with a gear reduction unit 166 mounted on the support platform 164, having an output shaft operatively connected to the drive roller 159. The motor units 162 and 165 are 220 volt, three-phase motors, each of which are selectively operable at predetermined high and low speeds. Each of the motor units 162 and 165 also are provided with mechanical brakes which are applied when the motors are de-energized to brake the motors between high and low speed operations.

As will hereinafter be described in greater detail, pretzels carried at random on the feed conveyor belt 32 between the side wall 35 and the divider wall 42 will be fed onto one of the conveyor belts 93 and 96 depending upon the position of the diverter gate 55. When the gate 55 is in the position as shown by the solid lines in FIG. 2, such pretzels will be diverted to the conveyor belt 96, and when the gate 55 is in the position as illustrated by the phantom lines in FIG. 2, such pretzels will be caused to be fed onto the conveyor belt 93. Similarly, pretzels carried on the feed conveyor belt 32 between side wall 36 and divider wall 42 will be fed onto either the conveyor belt 158 or the conveyor belt 161, depending upon the position of the diverter gate 51. When the diverter gate 51 is in the position as illustrated by the solid lines in FIG. 2, such pretzels will be diverted by the gate onto the belt 158. When the diverter gate 51 is in the position illustrated by the phantom lines in FIG. 2, such pretzels will be caused to bypass the diverter gate 51, and be diverted by the rear end of the side wall 152 onto the belt 161. Pretzels are guided downwardly from the feed belt 32 to the bag loading belts 158 and 161 along an inclined plate 167. Subsequently, pretzels fed onto the loading belts 158 and 161 will be conveyed to a discharge chute 168 to be loaded in bags held at the lower end of the chute by operating personnel.

In the operation of the apparatus illustrated in FIGS. 1 through 10, when the master switch MS is closed, 220 volt, three-phase current will be applied to motor 38 of feed conveyor belt 32, motors 79 and 82 of the box container loading belts 93 and 96, motors 162 and 165 for bag container loading belts 158 and 161, indexing motor 121 and motor 126. In addition, 120 volt, single-phase current will be applied to the control circuit illustrated in FIGS. 11a through 11d. Upon energization of the control circuit, relay 1M will be energized to close a contact energizing drive motor 38 to operate the feed conveyor belt 32. Simultaneously, energization of relay 2M will close a contact to energize the drive motor 126 to rotate a box container position at the pretzel loading station 101, on the support platform 130.

Initially, mechanically latched relay 23CR will be de-energized so that contact 23CR6 will be closed, thereby energizing relay 25CR. Energization of relay 25CR will close contact 25CR1 thereby energizing relay 14CR. Energization of relay 14CR will open contact 14CR1 to de-energize relay 4FM, close contact 14CR2 to start a counter 200, close contact 14CR3 to start a timer 8TR, and close contact 14CR5 to start a timer 17TR. Current supplied to relay 3FM through closed contacts 12CR1 and 3SM4, will close a contact in the supply circuit for motor 82 to operate the motor at a predetermined fast speed. As this occurs, the box loading conveying belt 93 will be driven at a high speed to load pretzels loaded thereon by the feed conveyor 32 in a previous cycle, into a box positioned at the pretzel loading station 101. During the box loading operation, the box supported on a platform 130 will be rotating to facilitate the loading and settling of the pretzels in the box.

The energization of timer 8TR will function to close contact 8TR1 for a predetermined period of time, thereby energizing relay 4SM which will close a contact in the supply circuit of the motor 79 to operate the motor at a predetermined low speed. Simultaneously, timer 17TR will function to close contact 17TR1 to energize the solenoid 54 of diverter mechanism 20 for a predetermined period of time thereby positioning the diverter gate 55 in the position as illustrated by the solid lines in FIG. 2, to divert pretzels carried on the feed conveyor belt 32 between side wall 35 and diverter wall 42, onto box container loading belt 96 operating at slow speed. It will be noted that under such conditions, the box container loading belt 93 will be operated at a high speed to load pretzels into the box position at the pretzel loading station 101 while the box container loading belt 96 will be operated at a slow speed to permit the loading of a second group of pretzels thereon.

While loading belt 93 operates at a high speed, loading belt 96 is running at low speed and the diverter gate 55 is positioned to divert pretzels onto slow running belt 96, pretzels carried by the feed conveyor belt 32 between the side wall 35 and the divider wall 42 will interrupt light beam 45 of photoelectric sensor 19 which correspondingly functions to transmit electrical signals to advance the counter 200. As soon as the counter 200 advances a predetermined number of times responsive to the signals of the photoelectric sensor 19, the counter 200 will operate to energize a relay 17CR. Energization of relay 17CR will function to momentarily close contact 17CR1 and open contact 17CR2 thereby energizing mechanically latched relay 22CR. When relay 22CR is energized, it will function to close relay 22CR4 to energize mechanically latched relay 23CR.

Energization of relay 23CR will open contact 23CR6 thereby de-energizing relay 25CR. This will cause contact 25CR1 to open and de-energize relay 14CR. De-energization of relay 14CR will reclose contact 14CR1 and reopen contact 14CR3 to open contact 8TR1 after a small time delay. This will function to energize relay 4M and de-energize relay SM to operate the motor 79 at fast speed. Correspondingly, box loading conveyor belt 96 will be caused to run at high speed to load pretzels previously fed thereon while running at a low speed, into an empty container advanced from the container loading station 100 to the pretzel loading station 101.

Energization of relay 23CR also will function to close contact 23CR5 to energize a relay 24CR. The energized relay 24CR then operates to close a contact 24CR1 which energizes a relay 12CR. Energization of relay 12CR functions to open contact 12CR1, and close contacts 12CR2, 12CR3 and 12CR5. The opening of contact 12CR1 de-energizes relay 3FM which opens a contact to de-energize the fast speed windings of motor 82. Simultaneously, the closing of contact 12CR3 energizes a timer 7TR which closes a contact 7TR to energize relay 3SM, closing a contact to energize the slow speed windings of the motor 82. As this occurs, the closing of contact 12CR5 energizes a timer 16TR which closes contact 16TR1 to energize the solenoid 53. Under such conditions, the diverter gate 55 is moved to the position illustrated by the phantom lines in FIG. 2 so that pretzels carried on the feed conveyor belt 32 between the side wall 35 and the divider wall 42 will be caused to be fed onto load conveyor belt 93 running at slow speed. Pretzels carried along the feed conveyor belt 32 and fed onto the loading conveyor belt 93 running at low speed, will interrupt the light beam 45 of the photoelectric sensor 19 which functions to transmit electrical signals to advance a counter 201. After a predetermined number of pretzels have been counted, the relay 17CR again will be energized to momentarily close contact 17CR1 and open contact 17CR2. Under such conditions, relay 22CR will be energized to energize relay 23CR. Energization of relay 23CR will reopen contact 23CR5 thereby de-energizing relay 24CR, and will reclose contact 23CR6 to energize relay 25CR. De-energization of relay 24CR will reopen contact 24CR1, de-energizing relay 12CR. This will reopen contact 12CR3 to de-energize timer 7TR thereby opening contact 7TR1 to de-energize relay 3SM. Simultaneously, contact 12CR1 will reclose to energize relay 3FM. With relay 3SM de-energized and relay 3FM energized, motor 82 will be operated at a fast speed to correspondingly operate the loading conveyor belt 93 at fast speed. From such point on, the control circuit as described will recycle until the master switch MS is opened, alternately running each of the loading conveyor belts at a slow speed to feed a batch of pretzels thereon while the other belt is running at a fast speed to unload another batch of pretzels into a container positioned at the pretzel loading station 101.

The alternate energization of relays 3FM and 4FM, functions to close contacts 3FM6 and 4FM6 to energize timers 9TR and 10TR, respectively. The timers 9TR and 10TR close a timer circuit 11TR which functions correspondingly to close a circuit through contacts 11TR1 and 11TR2 to energize a relay 3M. Energization of the relay 3M closes a contact to energize the index motor 121 through an angle of 90° thereby advancing each container on the transfer unit 12 from one station to a next succeeding station. It thus will be seen that after a predetermined time following the energization of either relay 3FM or 4FM, the relay 3M will be energized to rotate the index plate 105 and thus position an empty container at the loading position 101 to receive a load of pretzels from one of the loading conveyor belts 93 or 96.

Each container is gravity fed onto the container loading station 100 of the transfer unit by means of chute 100. The container is then advanced 90° by the index plate 12 to the pretzel loading station 101. As soon as the container has been loaded, it is advanced 90° to the weighing station 103 and positioned on the weighing platform 143. At such point, the operator of the transfer unit will either add or remove pretzels from the container in accordance with the overweight or underweight of the container as indicated by the display panel 144. With the weight of the container thus checked and adjusted, the index plate 105 then advances the loaded and weighed container to the unloading station 104. As the index plate rotates through such 90° angle, a roller 142 will engage the trip arm 138 of the ejection mechanism to rotate the pusher arm 139 and simultaneously load the coil spring 141. As soon as the container has been positioned at the container unloading station 104, the roller 142 will release the trip arm 138 thus causing the pusher arm 139 to rotate in a counterclockwise direction under the influence of the coil spring 141, to engage and eject the container along the chute 132 onto a moving conveyor belt 133. Thereafter, a lid is placed on the container and the container is ready to be transferred to a shipping or storage area.

The control circuit for the bag loading unit 13 functions in a manner similar to the control circuit for the box loading unit. In this respect, when mechanically latched relay 19CR is de-energized, current will flow through contact 19CR6 to energize relay 21CR. Energization of relay 21CR will close contact 21CR1 thereby energizing relay 15CR. This will cause contact 15CR1 to open, and contact 15CR2, 15CR3 and 15CR5 to close. As this occurs, relay 2FM will be de-energized thereby opening a contact to de-energize the fast speed windings of the motor 162, timer 6TR will be energized to close contact 6TR1 thereby energizing relay 2SM which closes a contact to energize the slow speed windings of the motor 162, and timer 15TR will be energized to close contact 15TR1 thereby energizing the solenoid 48. Under such conditions, the diverter gate 51 will be moved to the position illustrated by the solid lines in FIG. 2, and pretzels carried on the feed conveyor belt 32 between the side wall 36 and the dividing wall 42 will be caused to be diverted and to accumulate on the bag loading belt 158 operating at low speed. Simultaneously, the bag loading belt 161 will be operating at high speed to load pretzels previously accummultated thereon into a bag held by an operator below the discharge chute 168.

Pretzels carried on the feed conveyor belt 32 will interrupt light beam 46 of the photoelectric sensor 17 to transmit electrical signals which function to advance the counter 202. When a predetermined count has been reached, the counter 202 will energize a relay 16CR which will function to momentarily close contact 16CR1 and open contact 16CR2. When this occurs, mechanically latched relay 18CR will be energized to close contact 18CR4, thus energizing mechanically latched relay 19CR. Energization of relay 19CR will close contact 19CR5 to energize relay 20CR and de-energize contact 19CR6 to de-energize relay 21CR. De-energization of relay 21CR will reopen contact 21CR1 thereby de-energizing relay 15CR, and energization of relay 20CR will close contact 21CR1 thereby energizing relay 13CR. This will cause contact 13CR1 to open and contacts 13CR2, 13CR3 and 13CR5 to close. The opening of contact 13CR1 sill de-energize relay 1FM to open a contact and de-energize the fast speed windings of the motor 165. The closing of contact 13CR3 will energize the timer 5TR which functions to close contact 5TR1 for a predetermined amount of time. This will energize relay 1SM to close a contact and energize the slow speed windings of the motor 165. As this occurs, contact 13CR5 will energize timer 14TR which will function to close contact 14TR1 and thus energize the solenoid 49 to move the diverter gate 51 into the position illustrated by the phantom lines in FIG. 2. Under such conditions, pretzels carried on the feed conveyor belt 32 between the side wall 36 and the divider wall 42 will bypass bag loading belt 158, engage the side wall 152 and be diverted onto the bag loading belt 161 operating at slow speed.

Pretzels carried on the feed conveyor belt 32 between the side wall 36 and the divider wall 42, will interrupt the light beam 46 of the photoelectric sensor 17 to generate electrical signals which function to advance a timer 203. When a predetermined count has been reached by the counter 203, relay 16CR will be energized to momentarily close contact 16CR1 and open contact 16CR2 to energize mechanically latched relay 18CR. Energization of relay 18CR functions to close contact 18CR4 thereby energizing mechanically latched relay 19CR. As this occurs, contact 19CR5 will reopen to de-energize relay 20CR and contact 19CR6 will reclose to energize 21CR. The sequence then continues to complete the cycle by returning the diverter gate 51 to the position as illustrated by the solid lines in FIG. 2, operate the bag loading belt 158 at slow speed to accumulate a batch of pretzels thereon and operate the bag loading belt 161 at high speed to convey the previously accumulated batch of pretzels thereon to the loading chute 168.

It will be noted that when relay 1SM is energized, it functions not only to close a contact to energize the slow speed windings of the motor 165, but also to open a contact 1SM4 in the supply circuit of the associated relay 1FM and to close a contact 1SM5 which will energize a relay 1BR. Similarly, energization of the relay 1FM functions not only to close a contact to energize the fast speed windings of the motor 165, but also to open a contact 1FM4 in the supply circuit of the relay 1SM and to close a contact 1FM5 to energize the relay 1BR. Energization of the relay 1BR, in either instance, functions to remove the brake for the motor 165 during the fast speed or the low speed operation thereof. It thus will be seen that whenever either of the relays 1SM or 1FM is energized, the supply circuit for the other relay automatically is de-energized and the relay for the brake 1BR is energized to remove the brake during the operation of the motor. The apparatus further functions to apply the brake to the motor between the speed changing operation. It further will be noted that each of the motors for the other conveyor belts is provided with similar arrangements to brake the motor between speed change operation, and to remove the brake during either fast speed or low speed operation thereof.

It thus will be appreciated that the apparatus as described is operable to automatically and accurately count and load pretzels into box and bag containers simultaneously with a minimum of physical contact with the pretzels by the operators of the apparatus. The box loading unit 11 and the bag loading unit 13 can be operated either together or separately to count and load pretzels into box and/or bag containers. The apparatus further is adapted to vary the number and weight of the pretzels deposited in the box and bag containers simply by resetting the counters 200 through 203 and adjusting the weighing unit 108.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited soley by the apended claims.

I claim:

1. An apparatus for handling articles such as pretzels and the like comprising a first means for conveying said articles along a predetermined line of travel, a second means for conveying articles received from said first conveying means to a selected location, a third means for conveying articles received from said first conveying means to said selected location, means for operating said second conveying means selectively at predetermined high and low speeds, means for operating said third conveying means selectively at predetermined high and low speeds, means for guiding articles carried by said first conveying means selectively onto said second and third conveying means, and control means operative alternatively to operate one of said second and third conveying means at said predetermined slow speed while said guiding means operates to guide articles onto one conveying means and the other of said second and third conveying means operates at said high speed whereby said second and third conveying means operate alternatively at high speeds to convey groups of said articles to said selected location.

2. An apparatus according to claim 1 wherein said control means includes means for operating said second and third conveying means each for a predetermined period of time at said slow speed.

3. An apparatus according to claim 1 wherein said control means includes means for operating said guiding means alternatively to guide articles onto one of said second and third conveying means for a predetermined period of time.

4. An apparatus according to claim 1 wherein said control means includes means for counting articles carried by said first conveying means and fed onto one of said second and third conveying means, and said guiding means is operated responsive to a predetermined count of said counting means to switch guiding articles from one of said second and third conveying means to the other thereof.

5. An apparatus according to claim 4 wherein said counting means includes photoelectric sensing means having a light beam projecting across the path of said articles carried on said first conveying means.

6. An apparatus according to claim 1 wherein said control means includes means for operating said second and third conveying means each for a predetermined period of time at said slow speed, means for operating said guiding means alternatively to guide articles onto one of said second and third conveying means for a predetermined period of time, and means for counting articles carried by said first conveying means and fed onto one of said second and third conveying means, said guiding means is operable responsive to a predetermined count of said counting means to switch guiding articles from one of said second and third conveying means to the other thereof, and said counting means includes photoelectric sensing means having a light beam projecting across the path of said articles carried on said first conveying means.

7. An apparatus according to claim 1 wherein said first conveying means comprises a first endless conveyor belt having drive means and said second and third conveying means comprise second and third endless conveyor belts, each having drive means operable selectively at predetermined high and low speeds by said control means.

8. An apparatus according to claim 7 wherein said control means includes means for operating the drive means of said second and third endless conveyor belts, each for a predetermined period of time at said predetermined slow speed.

9. An apparatus according to claim 7 wherein said control means includes means for operating said guiding means alternatively to guide articles onto one of said second and third endless conveyor belts for a predetermined period of time.

10. An apparatus according to claim 7 wherein said control means includes means for counting articles carried by said first endless conveyor belt and fed onto one of said second and third endless conveyor belts, and said guiding means is operable responsive to a predetermined count of said counting means to switch guiding articles from one of said second and third endless conveyor belts to the other thereof.

11. An apparatus according to claim 7 wherein said counting means includes photoelectric sensing means having a light beam projecting across the path of said articles carried on said first endless conveyor belt.

12. An apparatus according to claim 7 wherein said control means includes means for operating the drive means of said second and third endless conveyor belts each for a predetermined period of time at said predetermined low speed, means for operating said guiding means alternatively to guide articles onto one of said second and third endless conveyor belts for a predetermined period of time, and means for counting articles carried by said first endless conveyor belt and fed onto one of said second and third endless conveyor belts, said guiding means is operated responsive to a predetermined count of said counting means to switch guiding articles from one of said second and third endless conveyor belts to the other thereof, and said counting means includes photoelectric sensing means having a light beam projecting across the path of said articles carried on said first endless conveyor belt.

13. An apparatus according to claim 1 including means for transfering containers for receiving groups of said articles along a predetermined line of travel including a container loading station, an article loading station coinciding with said selected location and a container unloading station, and indexing means for advancing each of said containers from one of said stations to a successive one of said stations preceding the fast speed operation of each of said second and third conveying means.

14. An apparatus according to claim 13 wherein said transfer means includes a weighing station disposed between said article loading station and said container unloading station.

15. An apparatus according to claim 13 wherein said transfer means includes means for rotating a container positioned at said article loading station to facilitate the loading and settling of articles fed from one of said second and third conveying means.

16. An apparatus according to claim 13 including means for automatically ejecting a container positioned at said unloading station.

17. An apparatus according to claim 13 wherein said transfer means includes a weighing station disposed between said article loading station and said container unloading station, means for rotating a container positioned at said article loading station to facilitate the loading and settling of articles fed from one of said second and third conveying means, and means for automatically ejecting a container positioned at said unloading station.

18. An apparatus according to claim 13 wherein said transfer means includes a container support platform and a rotatable member having surfaces engagable with containers supported on said platform for advancing said containers along said line of travel from each of said stations to a successive one of said stations.

19. An apparatus according to claim 18 wherein said transfer means includes a weighing station disposed between said article loading station and said unloading station.

20. An apparatus according to claim 18 wherein said transfer means includes means for rotating a container positioned at said article loading station to facilitate the loading and settling of articles fed from one of said second and third conveying means.

21. An apparatus according to claim 18 including means for automatically ejecting a container positioned at said unloading station.

22. An apparatus according to claim 18 wherein said transfer means includes a weighing station disposed between said article loading station and said unloading station, means for rotating a container positioned at said article loading station to facilitate the loading and settling of articles fed from one of said second and third conveying means, and means for automatically ejecting a container positioned at said article loading station.

23. An apparatus according to claim 1 including mans for conveying articles received from said first conveying means to a second selected location, a fifth means for conveying articles received from said first conveying means to said second selected location, means for operating said fourth conveying means selectively at predetermined high and low speeds, means for operating said fifth conveying means selectively at predetermined high and low speeds, and second means for guiding articles carried by said first conveying means selectively onto said fourth and fifth conveying means, and said control means including means operative alternatively to operate one of said fourth and fifth conveying means at said predetermined slow speed while said guiding means operates to guide articles onto said one conveying means and the other of said fourth and fifth conveying means operates at said high speed whereby said fourth and fifth conveying means operate alternatively at said high speeds to convey groups of said articles to said second selected location.

24. An apparatus according to claim 23 wherein said control means includes means for operating said fourth and fifth conveying means each for a predetermined period of time at said predetermined low speed.

25. An apparatus according to claim 23 wherein said control means includes means for operating said second guiding means alternatively to guide articles onto one of said fourth and fifth conveying means for a predetermined period of time.

26. An apparatus according to claim 23 wherein said control means includes second means for counting articles carried by said first conveying means and fed onto one of said fourth and fifth conveying means, and said second guiding means is operable responsive to a predetermined count of said second counting means to switch guiding articles from one of said fourth and fifth guiding means to the other thereof.

27. An apparatus according to claim 26 wherein said second counting means includes photoelectric sensing means having a light beam projecting across a selected path of said articles carried on said first conveying means.

28. An apparatus according to claim 23 wherein said control means includes means for operating said fourth and fifth conveying means each for a predetermined period of time at said predetermined slow speed, means for operating said second guiding means alternatively to guide articles onto one of said fourth and fifth conveying means for a predetermined period of time, and second means for counting articles carried by said first conveying means and fed onto one of said fourth and fifth conveying means, said second guiding means is operated responsive to a predetermined count of said second counting means to switch guiding articles from one of said fourth and fifth conveying means to the other thereof, and said second counting means includes photoelectric sensing means having a light beam projecting across a selected path of said articles carried on said first conveying means.

29. An apparatus according to claim 23 wherein said first conveying means comprises a first endless conveyor belt having drive means, and said fourth and fifth conveying means comprise fourth and fifth endless conveyor belts, each having drive means operable selectively at said predetermined high and low speeds.

30. An apparatus according to claim 29 wherein said control means includes means for operating the drive means of said fourth and fifth endless conveyor belts each for a predetermined period of time at said predetermined slow speed.

31. An apparatus according to claim 29 wherein said control means includes means for operating said second guiding means alternatively to guide articles onto one of said fourth and fifth endless conveyor belts for a predetermined period of time.

32. An apparatus according to claim 29 wherein said control means includes second means for counting articles carried by said first endless conveyor belt and fed onto one of said second and third endless conveyor belts, and said second guiding means is operated responsive to a predetermined count of said second counting means to switch guiding articles from one of said fourth and fifth endless conveyor belts to the other thereof.

33. An apparatus according to claim 32 wherein said second counting means includes photoelectric sensing means having a light beam projecting across a selected path of said articles carried on said first endless conveyor belt.

34. An apparatus according to claim 29 wherein said control means includes means for operating said fourth and fifth endless conveyor belts each for a predetermined period of time at said predetermined slow speed, means for operating said second guiding means alternatively to guide articles onto one of said fourth and fifth endless conveyor belts for a predetermined period of time, and second means for counting articles carried by said first endless conveyor belt and fed onto one of said fourth and fifth endless conveyor belts, said second guiding means is operable responsive to a predetermined count of said second counting means to switch guiding articles from one of said fourth and fifth endless conveyor belts to the other thereof, and said second counting means includes photoelectric sensing means having a light beam projecting across a selected path of said articles carried by said first endless conveyor belt.

35. An apparatus according to claim 1 including means for transferring containers for receiving groups of said articles along a predetermined line of travel including a container loading station, an article loading station coinciding with said selected location and a container unloading station, and indexing means for advancing each of said containers from one of said stations to a successive one of said stations preceding the fast speed operation of each of said second and third conveying means, and including a fourth means for conveying articles received from said first conveying means to a second selected location, a fifth means for conveying articles received from said first conveying means to said second selected location, means for operating said fourth conveying means selectively at predetermined high and low speeds, means for operating said fifth conveying means selectively at predetermined high and low speeds, and second means for guiding articles carried by said first conveying means selectively onto said fourth and fifth conveying means, and said control means including means operative alternatively to operate one of said fourth and fifth conveying means at said predetermined slow speed while said second guiding means operates to guide articles onto said one of said fourth and fifth conveying means and the other of said fourth and fifth conveying means operates at said predetermined high speed whereby said fourth and fifth conveying means operate alternatively at said predetermined high speeds to convey groups of said articles to said second selected location.

* * * * *